(12) United States Patent
Phillips

(10) Patent No.: US 9,657,808 B2
(45) Date of Patent: May 23, 2017

(54) ARC COIL SPRING CONFIGURATION

(71) Applicant: GM Global Technology Operations LLC, Detroit, MI (US)

(72) Inventor: Andrew W. Phillips, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/959,749

(22) Filed: Dec. 4, 2015

(65) Prior Publication Data

US 2016/0084342 A1 Mar. 24, 2016

Related U.S. Application Data

(62) Division of application No. 13/709,807, filed on Dec. 10, 2012, now Pat. No. 9,206,871.

(51) Int. Cl.
| | |
|---|---|
| *F16F 1/04* | (2006.01) |
| *F16F 15/123* | (2006.01) |
| *F16F 15/134* | (2006.01) |
| *F16F 15/121* | (2006.01) |
| *F16D 3/12* | (2006.01) |
| *F16F 15/133* | (2006.01) |
| *F16F 15/30* | (2006.01) |

(52) U.S. Cl.
CPC ............ *F16F 15/1213* (2013.01); *F16D 3/12* (2013.01); *F16F 1/042* (2013.01); *F16F 1/043* (2013.01); *F16F 15/123* (2013.01); *F16F 15/1331* (2013.01); *F16F 15/30* (2013.01)

(58) Field of Classification Search
CPC .... F16D 3/12; F16D 3/66; F16F 1/042; F16F 1/043; F16F 15/1213; F16F 15/123; F16F 15/133; F16F 15/1331; F16F 15/134; F16F 15/30
USPC ....................................... 464/67.1, 68.1, 68.9
See application file for complete search history.

(56) References Cited

U.S. PATENT DOCUMENTS

| 198,843 | A | * | 1/1878 | Godley ..................... F16F 1/06 213/29 |
|---|---|---|---|---|
| 2,330,076 | A | | 9/1943 | Ochsenbein |
| 2,700,540 | A | * | 1/1955 | De Juhasz .............. F16F 1/042 267/180 |
| 5,642,875 | A | | 7/1997 | Albers et al. |
| 8,684,342 | B2 | | 4/2014 | Fenioux et al. |
| 2002/0010028 | A1 | | 1/2002 | Shibata et al. |
| 2008/0191400 | A1 | | 8/2008 | Liu |

FOREIGN PATENT DOCUMENTS

| DE | 19544365 A1 | 6/1997 | |
|---|---|---|---|
| JP | 8105508 A | 4/1996 | |
| SU | 798382 A1 * | 1/1981 | .............. F16F 1/043 |
| WO | 2007006255 A2 | 1/2007 | |

* cited by examiner

*Primary Examiner* — Josh Skroupa

(57) ABSTRACT

Arc coil springs utilize coil spring wire formed in a substantially trapezoidal or other shape such that when bottomed, the side surfaces of the coil abut and carry the bottoming load. The angles of the sidewalls of the substantially trapezoidal cross section wire are preferably coincident with lines of radius when the spring is installed in an arc in a clutch, damper or flywheel. The radius of the outer surface of the arc coil spring wire is matched to the radius of the inner surface of the guide or housing so that the area of contact is large.

13 Claims, 2 Drawing Sheets

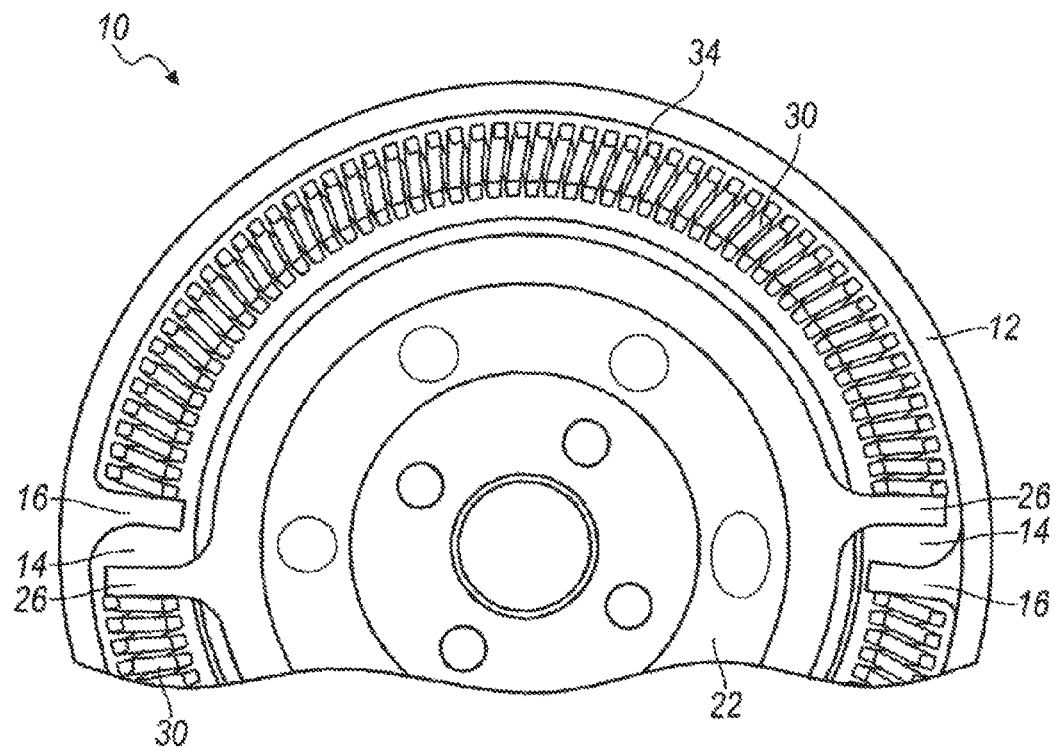
FIG. 1
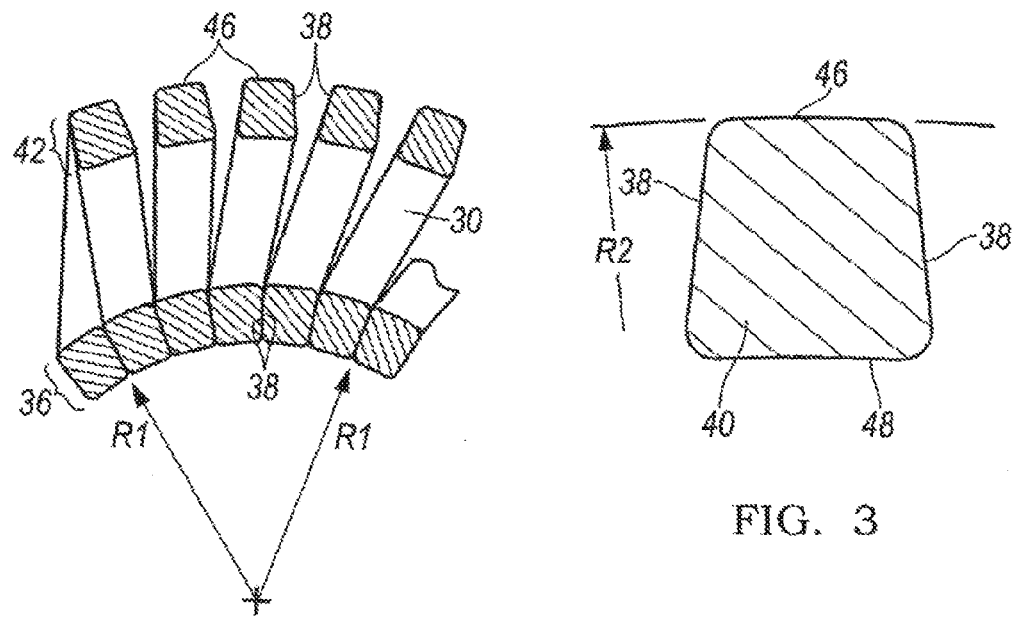
FIG. 2
FIG. 3

ARC COIL SPRING CONFIGURATION

CROSS REFERENCE TO RELATED APPLICATIONS

This application is a divisional of U.S. Non-Provisional application Ser. No. 13/709,807 filed Dec. 10, 2012, now U.S. Pat. No. 9,206,871, granted Dec. 8, 2015. The disclosure of the above application is incorporated herein by reference.

FIELD

The present disclosure relates to coil springs utilized in arc (curved) applications and more particularly to coil springs utilized in arc applications having a coil cross section that minimizes wear and stress associated with bottoming.

BACKGROUND

The statements in this section merely provide background information related to the present disclosure and may or may not constitute prior art.

Coil compression springs find wide application as energy storage devices in power train components where they temporarily absorb driveline transients and smooth power delivery. They are frequent and common components of manual transmission clutches, disposed between drive and driven components where they lessen driveline shock and smooth clutch engagement.

In such applications, the coil spring is frequently installed not in a straight line, helical configuration but in an arc, its radius of curvature dictated by its distance from the center axis (of rotation) of the clutch. The installation of a coil compression spring in an arc creates a plethora of engineering, design and service issues.

For example, whereas the bottoming of a conventional straight helical coil spring occurs essentially everywhere along a helical line of contact between adjacent coils, bottoming of an arc coil spring occurs only proximate its inner diameter in the region where the coils are closer in its uncompressed state. In fact, only a very small region of each coil may carry the bottoming load. Thus, coils of an arc coil spring are subjected to higher stress for the same bottoming load relative to a straight helical spring since only a portion of each coil carries the load.

Another engineering issue relates to the outer surface of an arc coil spring. Almost without exception, an arc coil spring is constrained within a guide or housing which maintains the spring in its proper position between end points. Specifically, it is the outer surface of the arc coil spring that must be constrained and this is generally accomplished by a curved housing that at least partially surrounds the arc spring. Accordingly, there will typically be significant force and friction between the outer surface of the arc spring and the inner surface of the curved spring housing.

The present invention is directed to solving these problems and improving the performance and service life of arc coil springs.

SUMMARY

The present invention provides an arc coil spring having improved performance and service life. To improve the performance of an arc coil spring by reducing stress when it is bottomed, the cross section of the wire from which the coil is fabricated is substantially trapezoidal such that when bottomed, the angled flat sidewalls of the coils abut and carry the bottoming load which is distributed over a comparatively large surface area. From a spacial geometry standpoint, the contact between adjacent coils is along a line of radius rather than the point contact between adjacent coils of a round wire, prior art spring. The angle of the sidewalls of the trapezoidal cross section wire is selected so that when the spring is disposed in an arc, the angled sidewalls of the inner coils of the spring are coincident with lines of radius. It will be appreciated that alternate embodiment sidewall configurations such as complementary oblique or complementary concave and convex surfaces which abut along a line of contact when the spring is fully compressed or bottomed out are within the purview of this invention.

Additionally, the radius of the outer surfaces of the coils of the arc coil spring coincides with the radius of the inner surface of the guide or housing containing the arc spring so that the area of contact is large, thereby distributing the outwardly directed spring force over a relatively large area, reducing the force per unit area and improving lubrication retention on the contacting surfaces.

Thus it is an aspect of the present invention to provide an arc compression spring having a coil wire cross section that is substantially trapezoidal.

It is a further aspect of the present invention to provide an arc coil spring having coil wire having parallel contacting sidewalls when the spring is bottomed out.

It is a still further aspect of the present invention to provide an arc coil spring having coil wire having sidewalls which abut along a line of radial contact when the spring is bottomed out.

It is a still further aspect of the present invention to provide an arc coil spring having coil wire having radial and oblique sidewalls or concave and convex sidewalls.

It is a still further aspect of the present invention to provide an arc coil spring having coil wire having a radiused outer surface that conforms to the radius of the inner surface of a housing.

It is a still further aspect of the present invention to provide an arc coil spring having improved stress carrying capability when bottomed out.

It is a still further aspect of the present invention to provide an arc coil spring having improved lubrication and reduced friction between the spring and a housing.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a front, elevational view of a dual mass flywheel incorporating arc coil springs according to the present invention;

FIG. 2 is an enlarged, fragmentary, sectional view of a plurality of fully compressed, i.e., bottomed out, coils of an arc coil spring of a dual mass flywheel according to the present invention;

FIG. 3 is a greatly enlarged, cross sectional view of an outer coil wire of an arc coil spring according to the present invention;

DETAILED DESCRIPTION

Figure 4:
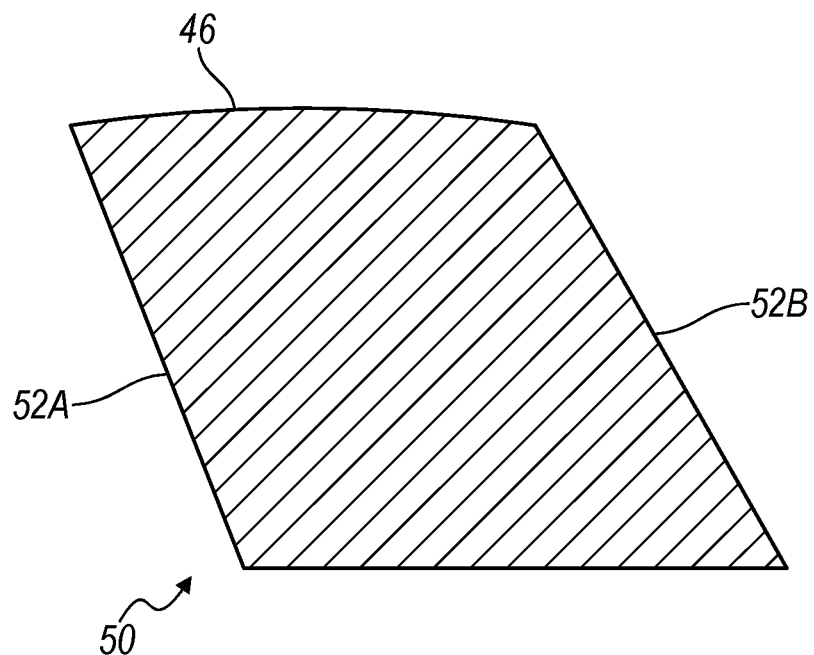
FIG. 4 is a greatly enlarged, fragmentary, sectional view of a coil of a first alternate embodiment of an arc coil spring according to the present invention.

The following description is merely exemplary in nature and is not intended to limit the present disclosure, application, or uses.

With reference to FIG. 1, a portion of a rotating transient absorbing and damping device such as a clutch, damper or dual mass flywheel incorporating the present invention is illustrated and generally designated by the reference number 10. The dual mass flywheel 10 includes a first circular plate or disc 12 axially spaced from a second circular plate or disc 22. Each of the plates or discs 12 and 22 are connected to respective co-axial drive and driven members such as shafts or quills (both not illustrated) and define a curved spring receiving passageway or opening 14 having lugs, tabs or stops 16 and 26 at opposite ends on opposite plates or discs 12 and 22 that apply force to a pair of diametrically opposed arc coil springs 30 and locate their ends. That is, at one end of the coil spring 30 in the upper portion of FIG. 1, for example, the left end, the first plate or disc 12 includes a lug, tab or stop 16 that engages the arc coil spring 30 and at the other end, the right end, the second plate or disc 22 includes a lug, tab or stop 26 that engages the arc coil spring 30.

A second set of the lugs, tabs or stops 16 and 26 engage the ends of the arc coil spring 30 in the lower portion of FIG. 1. Preferably, the ends of the arc coil springs 30 are ground so that the end surface is smooth, flat and essentially perpendicular to the axis of the arc coil spring 30 when it is in a relaxed, i.e., straight, state. The two arc coil springs 30 thus cooperatively act as a damper or transient shock absorber between the drive and driven members connected to the plates or discs 12 and 22. Each of the arc coil springs 30 includes a plurality of coils 32 which extend in an arc over slightly less than 180° when in a relaxed state as illustrated in FIG. 1. It should be appreciated that more arc coil springs 30 each extending over smaller circumferential arcs or angles may also be utilized with the present invention. For example, three arc coil springs 30 each extending over slightly less than 120° or four arc coil springs 30 each extending over slightly less than 90° may alternatively be utilized with the present invention. One or both of the circular plates or discs 12 and 22 includes all or portions of a curved circular housing, surface or guide 34 which retains the arc coil springs 30 in position between the lugs or tabs 16 and 26 and against which the outer surfaces of the arc coil springs 30 are in contact, slide against and are restrained.

Referring now to FIG. 2, a portion of the upper one of the arc coil springs 30 illustrated in FIG. 1 is illustrated in a compressed, bottomed out state, that is, in the inner portion 36 of the arc spring 30, the inner coils 32 are compressed against one another due to a high torque differential across the driven and driven plates or discs 12 and 22 of the dual mass flywheel 10 such that no further relative rotary motion (in the direction of spring compression) between the drive and driven plates or discs 12 and 22 is possible. Stated somewhat differently, the arc coil springs 30 bottom out when the computed or required angular compression of the arc coil springs 30 is equal to or greater than the applied torque divided by the spring constant of the two arc coils springs 30.

Certain consequences follow from this fully compressed condition. First of all, the arc coil springs 30 cease to provide any damping or shock absorbing and any rotational transients or shocks will be transmitted essentially without modification through the damper or dual mass flywheel 10. Second of all, instead of being transmitted helically through the entire length of the coils of the arc coil springs 30, the torque will be transmitted from side face to side face or surface to surface 38 through the inner coils 36 of the arc coil springs 30. Thus, the side faces or surfaces 38 of the inner coils 36 may be subjected to high constant or repeated transient stress.

As illustrated in FIG. 2, the adjacent side faces or surfaces 38 of the inner coils 36 of the arc coils springs 30 are formed or shaped to define, i.e., be co-planar with, lines of radius or reference planes R1 which are perpendicular to the plane of the drawing when in either a curved, relaxed state, as illustrated in FIG. 1 or in a fully compressed (bottomed out) state as illustrated in FIG. 2. Thus, along a radial line and for at least a small portion of their circumference, the side faces or surfaces 38 of adjacent inner coils 36 of the arc spring 30 are in flat, intimate contact with one another. The smaller the mean diameter of the inner coils 36 (and the arc coil spring 30 overall) and the smaller their number over a given arc or circumferential angle, the larger is the included angle between the side faces or surfaces 38 of a single coil. The larger the mean diameter of the inner coils 36 (and the arc coil spring 30 overall) and the greater their number over a given arc or circumferential angle, the smaller is the included angle between the side faces or surfaces 38 of a single coil.

The included angle between the side faces or surfaces 38 of an inner coil 36 may be readily calculated if the number of coils in a fully compressed or bottomed out state and the included circumferential angle of the bottomed out inner coils 36 are known. For example, if thirteen bottomed out inner coils 36 occupy an angle of 90°, each inner coil 36 will occupy 6.92° and thus for the two side faces or surfaces 38 to coincide with lines of radius, the included angle between the side faces or surfaces 38 will be 6.92° and each side face or surface 38 will be at an angle of 3.46° to a line of radius. Functional included angles between the side faces or surfaces 38 of the spring wire 40 will range from less than 2° to about 10°. The cross section of the spring wire 40 of the coils of the arc spring 30 in the preferred embodiment is thus substantially trapezoidal. It should be appreciated that the substantially trapezoidal, nearly square, cross section of the spring wire 40 of the arc coil spring 30 in general allows higher energy density than conventional, round spring wire due to the r/J strain relationship in bending because more material is at a greater distance from the centerline of the arc coil spring 30.

Referring now to FIGS. 2 and 3, it should be appreciated that given the substantially trapezoidal cross section of the spring wire 40 and the fact that such arc coil springs 30 are wound from such trapezoidal cross section wire 40, having the side faces or surfaces 38 of the inner coils 36 defining lines or planes that converge at the center axis of the dual mass flywheel 10 means that the outer coils 42 with the same side faces or surfaces 38 will define lines or planes that converge radially outwardly. As illustrated in FIG. 2, this configuration places narrow (inner) edges of the faces or surfaces 38 of the outer coils 42 proximate one another in direct opposition to the present teaching. This configuration and arrangement is of no consequence, however, as the outer coils 42 of the arc coil spring 30 are incapable of having their adjacent faces or surfaces 38 contact one another, i.e., bottom out, when disposed in an arc as illustrated in FIG. 1 or so disposed and bottomed out as illustrated in FIG. 2.

The outer face or surface 46 of the spring wire 40 and thus of the outer coils 42 defines a curve or radius R2 essentially equal to the radius of the inner surface or guide 34 (illustrated in FIG. 1). Thus, as the arc coil spring 30 circumferentially compresses within the circular housing, surface or guide 34, friction is reduced and smooth motion is facilitated due to the complementary radiused surfaces: the outer face or surface 46 of the spring wire 40 and the surface or guide 34. This configuration increases the area of contact, thereby distributing the outwardly directed force of the arc spring 30 over a large area, reducing the force per unit area and improving lubrication retention on the contacting surfaces 34 and 46. The inside face or surface 48 of the spring wire 40 may be flat and at equal angles to the side faces 38 and thus parallel to the axis of the spring 30 in a relaxed, i.e., straight, state or any other readily achieved configuration and finish as it does not contact other surfaces or elements or contribute to the improved function of the invention.

Figure 5:
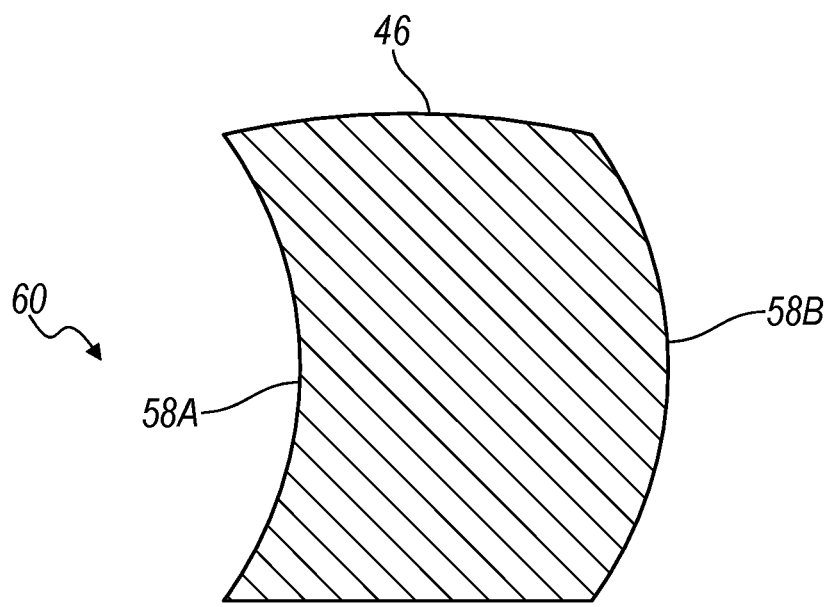
FIG. 5 is a greatly enlarged, fragmentary, sectional view of a coil of a second alternate embodiment of an arc coil spring according to the present invention.

Referring now to FIGS. 4 and 5, it will thus be appreciated that the central feature of an arc coil spring according to the present invention is the configuration of the sidewalls or side faces 38 of the arc spring 30 such that they are parallel and in contact along a line of radius and circumferentially as well over a small distance, thereby avoiding the essentially point contact which an arc spring fabricated of conventional round spring wire is subjected to when disposed in an arc and bottomed out. Accordingly, it should be understood that sidewall profiles other than flat and coincident with a line of radius when disposed in a given arc may be utilized. For example, in FIG. 4, an arc spring 50 is illustrated having sidewalls 52A and 52B disposed at significant angles that nonetheless result in line contact between adjacent sidewalls 52A and 52B when the arc spring 50 is fully compressed or bottomed out. Other sidewall angles and profiles, such as radiused, i.e., mating or nesting concave and convex curved surfaces 58A and 58B on an arc coil spring 60 as illustrated in FIG. 5, are also deemed to be within the purview of the present invention. Both embodiments 50 and 60 include the outer radiused face or surface 46 which is complementary to the surface or guide 34 (illustrated in FIG. 1).

The description of the invention is merely exemplary in nature and variations that do not depart from the gist of the invention are intended to be within the scope of the invention. Such variations are not to be regarded as a departure from the spirit and scope of the invention.

What is claimed is:

1. An arc spring and housing for a rotating damper comprising, in combination,
    a housing having a region for receiving an arc spring, said region having an outer, curved, spring engaged surface defining a radius from a center of rotation of said housing and a stop at each end of said spring receiving region, and
    an arc spring disposed in said region between said stops, said arc spring defining a plurality of coils, said coils fabricated of spring wire having sidewalls configured to contact one another along a line when fully compressed and an outer surface of said spring wire having a radius of curvature substantially equal to said radius of said curved, spring engaged surface of said housing,
    wherein said sidewalls of said spring wire are complementarily curved.

2. The arc spring and housing of claim 1 wherein said housing includes a first drive portion and a second driven portion and wherein one of said stops is coupled to said first drive portion and another of said stops is coupled to said second driven portion.

3. The arc spring and housing of claim 1 wherein inner regions of said arc spring are in sidewall to sidewall contact when said arc spring is fully compressed.

4. The arc spring and housing of claim 1 wherein a pair of arc springs are disposed in said housing in diametrical opposition.

5. The arc spring and housing for a rotating damper of claim 1 wherein one of said complementarily curved sidewalls is concave and another of said complementarily curved sidewalls is convex.

6. A coil spring adapted for compression in an arc in a circular component comprising, in combination,
    a plurality of helical coils of spring wire, said coils spaced apart in a relaxed state, said spring wire defining a substantially arcuate cross section having opposed, complementary sidewalls, said sidewalls defining a first, concave surface and a second, convex surface, outer corners and inner corners, an outer radiused surface extending between said outer corners of said sidewalls and an inner flat surface extending between said inner corners of said sidewalls.

7. The coil spring of claim 6 wherein said coils are spaced apart along an axis and a width of said spring wire is substantially constant from said inner surface to said outer surface.

8. The coil spring of claim 7 wherein a surface of said coils closest to said axis is substantially parallel to said axis.

9. The coil spring of claim 6 wherein said outer radiused surface defines a radius equal to a radius of a spring housing of said circular component.

10. The coil spring of claim 6 wherein said coil spring is disposed in an arc, in at least diametrically opposed pairs in said circular component.

11. A coil spring configured for compression in an arc in a circular, rotating component, comprising, in combination,
    a plurality of helical coils of spring wire, said coils spaced apart in a relaxed state, said spring wire defining a cross section having opposed complementarily curved concave and convex sidewalls, outer edges and inner edges, an outer radiused surface extending between said outer edges of said sidewalls and an inner surface extending between said inner edges of said sidewalls.

12. The coil spring of claim 11 wherein said coils are spaced apart along an axis and said inner surface is flat and substantially parallel to said axis.

13. The coil spring of claim 11 wherein said coil spring is disposed in at least diametrically opposed pairs in said circular, rotating component.

* * * * *